Patented Nov. 14, 1933

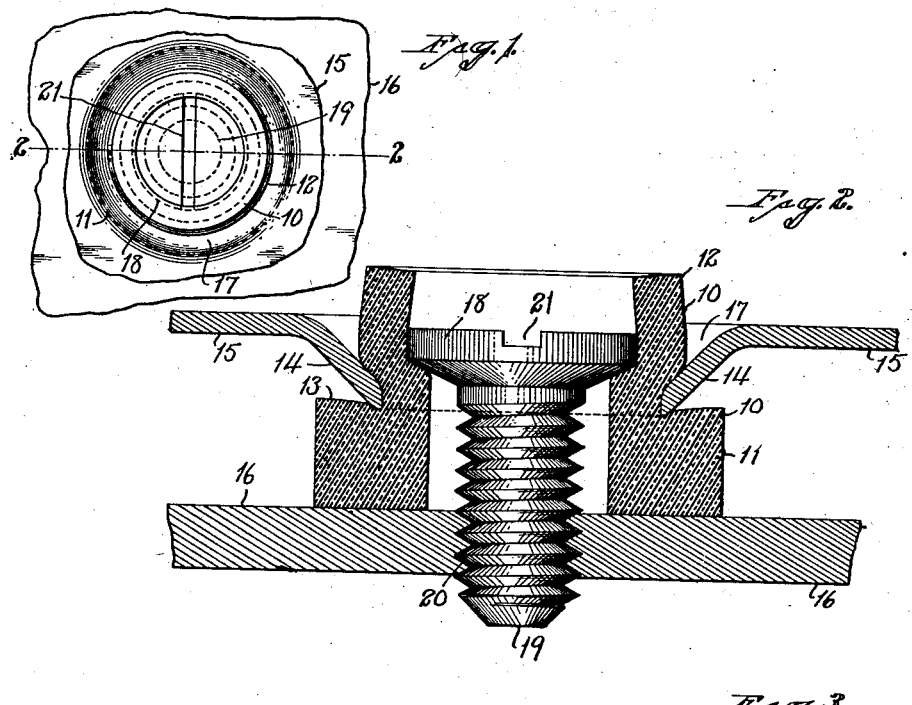
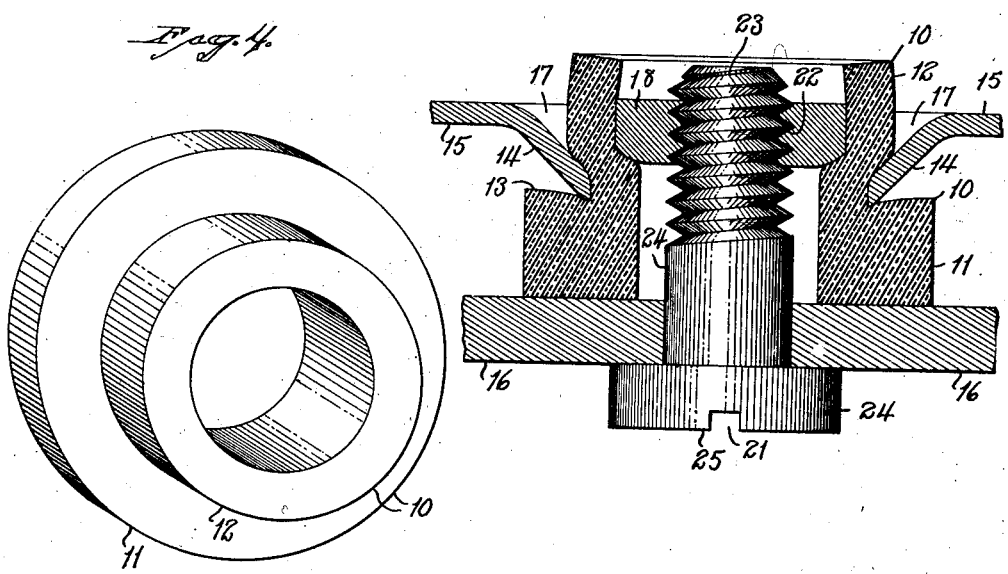

1,935,202

UNITED STATES PATENT OFFICE 1,935,202

SOUND-DEADENING ATTACHING DEVICE

Albert H. Chamberlain and Thomas H. Chamberlain, New Haven, Conn., assignors to The New Haven Clock Company, New Haven, Conn., a corporation Application October 6, 1931. Serial No. 567,250

2 Claims. (Cl. 287—85)

This invention relates to an improvement in sound-deadening attaching devices, that is to say, devices which while serving to attach or connect together two members or units, will serve also to minimize the transmission of sound from one member or unit to the other.

Our invention, while adapted for use in a wide variety of situations, is particularly adapted for use in electric clocks where it is desired to reduce to the minimum the propagation of motor hum, gear noise, etc., by the clock-case or other features of the clock which might act more or less as sounding boards.

The main object of our present invention is to provide at a low cost for manufacture, a simple and convenient sound-deadening attaching device designed with particular reference to providing secure attachment between two members without, however, transmitting appreciable noise or vibration from one to the other.

With the above and other objects in view as will appear from the following, our invention consists in a sound-deadening attaching device having certain features of construction and combinations and arrangements of parts as will be hereinafter described and particularly recited in the claims.

In the accompanying drawing:

Fig. 1 is a broken face view illustrating two plate-like members secured together in accordance with our invention;

Fig. 2 is a sectional view taken on the line 2—2 of Fig. 1, but on a larger scale;

Fig. 3 is a sectional view corresponding to Fig. 1, but showing a slight modification of the parts to secure substantially the same results; and Fig. 4 is a perspective view of the tubular cushion detached.

In carrying out our invention as herein shown, we employ a tubular cushion, generally designated by the numeral 10, and composed of resilient and sound-deadening material such as soft rubber, and comprising a flange-like head 11 and a shank 12 offsetting therefrom, but of lesser diameter so as to provide a shoulder or seat 13 for the edge of the sloping annular offset 14 of a plate 15, which constitutes one of two members which it is desired to attach together and complementing a plate 16, constituting the other member. The offset 14 of the plate 15 serves to produce in the upper face of the latter, as viewed in the drawing, a tapered recess 17 into which the shank 12 projects as shown.

The head-portion 13 of the cushion 10 is interposed between the offset 14 of the plate 15 and the complementary plate 16, and serves as a cushion therebetween. To prevent the lateral separation of the plates 15 and 16, we employ what we shall for convenience of description refer to as an "expander" 18, which is entered into the interior of the tubular shank 12 and is of sufficiently larger diameter than the interior of the same to effect the expansion of the shank outward into the recess 17 of the plate 15.

To provide for drawing the expander 18 into the shank 12 for the purpose of expanding the same, as above described, we provide the said expander with an integral screw-threaded stem 19 entering into a screw-threaded passage 20 in the plate 16. The expander 18, together with its integral shank, may be turned for screwing the expander inward into the shank 12 for the purpose above described, by the insertion of a screw driver or other suitable tool into a kerf 21 formed in the upper surface of the said expander, as shown in Figs. 1 and 2.

Instead of providing the expander 18 with an integral screw-threaded shank, as shown in Figs. 1 and 2, we may, and as shown in Fig. 3, provide the said expander with an internally-threaded axial passage 22 to receive the threaded stem 23 of a screw or bolt 24 extending through the plate 16 and having its head 25 seated against the outer surface thereof.

As thus constructed and arranged, the cushion 10 will serve not only to securely attach the plates 15 and 16 or any other desired members together against lateral separation, but will serve to a marked degree to minimize the transmission of noise from one plate to the other.

It will be understood by those skilled in the art that our invention may assume varied physical forms without departing from our inventive concept and we, therefore, do not limit ourselves to the specific embodiments herein chosen for illustration, but only as indicated in the appended claims.

We claim:

1. The combination with two members to be attached, one of which has an opening therethrough; of a cushion formed of resilient material such as soft rubber and having an axial passage therethrough, and comprising a flange-like head-portion interposed between the two said members, and a shank of lesser diameter than the said head-portion and offsetting therefrom and extending through said opening in said one of the said members; an expander engaging within the passage in the shank of the said cushion and sufficiently larger in diameter than the normal unstretched diameter of the passage therethrough to expand the same, the interior surface of the axial passage through the flange-like head-portion of the resilient cushion being free and unsupported; and means for drawing the said expander into the shank of the said cushion to expand the same outwardly to engage one side of the said one member adjacent said opening.

2. The combination with two members to be attached, one of which is formed with an opening therethrough; of a cushion formed of resilient material such as soft rubber and having an axial passage therethrough, and comprising a flange-like head-portion interposed between the two said members, and a shank of less diameter than the said head-portion and offsetting therefrom and extending through the said opening in the said one of the two members; an expander located entirely within and below the end of, and in direct contact with the material of, the shank of the said cushion and sufficiently larger in diameter than the normal unstretched diameter of the passage therethrough to expand the same, the interior surface of the axial passage through the flange-like head-portion of the resilient cushion being free and unsupported; and means for drawing the said expander into the shank of the said cushion to expand the same outwardly to engage one side of the said one member adjacent said opening.

ALBERT H. CHAMBERLAIN.
THOMAS H. CHAMBERLAIN.